United States Patent Office 3,362,885
Patented Jan. 9, 1968

3,362,885
PROCESS FOR THE PRODUCTION OF
GLUTAMIC ACID
Roger L. Harned, Terre Haute, Ind., assignor to Commercial Solvents Corporation, New York, N.Y., a corporation of Maryland
No Drawing. Filed July 19, 1965, Ser. No. 473,232
8 Claims. (Cl. 195—47)

This invention generally relates to a process for the production of glutamic acid by fermentation. In a particular aspect it relates to an improved nutrient medium for production of glutamic acid by fermentation.

Glutamic acid is produced in high yields by the fermentation of nutrient media with certain glutamic acid-producing strains of microorganisms. A satisfactory method for the production of glutamic acid is described in U.S. Patent No. 2,978,383 and U.S. Patent No. 2,978,384, both issued on Apr. 4, 1961, to Koichi Yamada. This method utilizes an aqueous nutrient medium comprising a carbohydrate source, a nitrogen source, a phosphate source, a potassium source, and trace amounts of mineral salts. Briefly, the process for the production of glutamic acid involves incubating a glutamic acid-producing strain of the microorganisms, Brevibacterium divaricatum, in an aqueous nutrient medium containing the above-mentioned ingredients. The fermentation is preferably carried out at temperatures ranging from about 30 to about 40° C. at a pH ranging from about 6 to about 9 under submerged conditions of agitation and aeration. The organisms of the genera Bacillus, Micrococcus, Brevibacterium, Microbacterium, Corynebacterium, Arthrobacter, and the like may also be used to produce glutamic acid by similar processes using similar nutrient media as are described in the art.

Acid-hydrolyzed starch is an excellent carbohyrate source for nutrient media used in fermentation processes, and especially in nutrient media used for the production of glutamic acid by fermentation. In the processes previously used, crude or refined starch is hydrolyzed in the presence of sulfuric acid to convert the starch to reducing sugar, usually calculated as glucose. Refined starch is relatively expensive compared with crude starch sources, such as ground corn flour and dry-milled starch obtained by dry milling of cereal grains, but these crude starch sources are not satisfactory for glutamic acid production by fermentation because they contain an undesirable amount of biotin, which is not affected by the acid treatment heretofore used. In general, an amount of biotin of more than 5 mcg./100 g. of the carbohyrate content of the crude starch is undesirable for glutamic acid production because it leads to prolific growth of the organism without concomitant production of glutamic acid. It is known, however, that biotin in an amount of from about 1 mcg. to 5 mcg. per 100 g. of carbohydrate is beneficial for the production of glutamic acid, as disclosed by Kinoshita in U.S. Patent 3,002,889. The sulfuric acid hydrolyzate obtained from crude starch contains biotin in such amounts that when the hydrolyzate is employed as the carbohydrate source in the nutrient medium for the production of glutamic acid by fermentation, little or no glutamic acid is produced.

Previous workers have also been concerned with the problem of excess biotin in carbohydrate sources. Okumura et al., U.S. Patent 3,136,702, solved the problem by treating the carbohydrate source with a yeast and then employing the treated carbohydrate source in a nutrient medium. Okada et al., U.S. Patent 3,138,540, treated cane and beet sugar molasses with hydrogen peroxide or ammonium persulfate to simultaneously decolorize the molasses and remove the excess biotin. These procedures were intended for saccharide materials and there is no indication that they would be satifactory for treating acid-hydrolyzed crude starch.

It is an object of this invention to provide a new process for the production of glutamic acid.

It is an additional object of this invention to provide a new carbohydrate source for nutrient media used in glutamic acid fermentation processes.

It is another object of this invention to provide an improved nutrient medium for the production of glutamic acid by fermentation.

Still another object is to provide a carbohydrate source substantially free from biotin for use in a nutrient medium for production of glutamic acid by fermentation.

It is a further object of this invention to provide a method for using a crude starch material containing an undesirably high amount of biotin in a glutamic acid fermentation process.

Other objects will be apparent to those skilled in the art from the description of this invention.

A new process has been discovered for the production of glutamic acid by fermentation which comprises hydrolyzing a starch source containing more than 5 mcg. biotin per 100 g. carbohydrate in the presence of nitric acid, incorporating the hydrolyzed starch source in a fermentation medium, cultivating a glutamic acid-producing microorganism in said fermentation medium and recovering glutamic acid from said medium. By means of the new process the above-mentioned problems of the hydrolyzed biotin-containing starch are lessened. Therefore, in the new process, it is possible to use the higher-biotin starch sources as raw materials. Because the higher biotin starch sources are generally more economical than refined starch sources, and because hydrolysis in the presence of nitric acid eliminates unsatisfactory fermentation due to excess biotin, the nutrient medium provided by the present process represents an improvement over previous nutrient media used for the production of glutamic acid by fermentation using glutamic acid-producing strains of microorganisms, e.g., Micrococcus glutamicus, Brevibacterium divaricatum, and the like.

Generally, the process consists of hydrolyzing a crude starch source containing more than 5 mcg. of biotin per 100 g. carbohydrate in the presence of nitric acid in an amount and concentration and for a time period effective to convert substantially all of the starch to sugar whereby the biotin level is reduced to below 5 mcg./100 g. of carbohydrate. A preferred process consists of partially hydrolyzing with stirring a first increment of a viscous, aqueous suspension of a starch source containing more than 5 mcg. per 100 g. of carbohydrate in the presence of nitric acid at a temperature of about 80° C. until the suspension thins, adding with stirring a second increment of said starch suspension, again heating at 80° C. until the suspension thins, and then completing the hydrolysis by heating under steam pressure for 2 hours in an autoclave at 15 p.s.i.g. After heating, the hydrolyzate is cooled, neutralized with ammonium hydroxide and filtered. The resultant hydrolyzed starch will now contain less than 5 mcg. biotin per 100 g. carbohydrate. It is then used as the carbohydrate source in a nutrient medium for the production of glutamic acid by fermentation in accordance with methods known in the art, e.g., the method described in U.S. Patents 2,978,-383 and 2,978,384.

The heating period for hydrolysis is not critical, but a longer period is required at low temperatures than at high. The hydrolysis of starches with sulfuric acid is a procedure well known in the art and, in general, the same conditions are used for the hydrolysis of starch with nitric acid in accordance with this invention. A period of about 15–30 minutes at a temperature of about 80° C. is generally adequate for the preliminary treatment, and a period of about 2 hours at 15 p.s.i.g. of steam is generally sufficient for the final treatment. The preliminary treatment is for the purpose of making the mixture more manageable and insuring a homogeneous mixture.

The nitric acid employed in the practice of this invention can be diluted, concentrated, or fuming nitric acid, preferably the concentrated nitric acid of commerce, about 70% by weight. The amount of acid employed for the starch hydrolysis is not critical, but generally about 1 ml. of acid per about 25 g. of starch which provides an acidity of about 0.05 N to about 0.10 N, preferably about 0.08 N, provides rapid hydrolysis without excessive use of acid. If dilute acid is employed, the amount should be sufficient to provide the desired acidity and correspondingly, the volume of water employed for preparing the suspension should be reduced. In general the amount of nitric acid employed and the temperature and time required for hydrolysis are selected to convert substantially all of the carbohydrates to sugar and to reduce the biotin content from more than 5 mcg. per 100 g. of carbohydrate to less than 5 mcg. per 100 g. of carbohydrate.

Although the nitric acid treatment has been described using nitric acid as the sole acid source for hydrolysis, it will be obvious to those skilled in this art that acid mixtures containing nitric acid are equivalent to nitric acid in the practice of this invention. Such mixtures include a mixture of sulfuric acid and nitric acid sufficient to convert substantially all of the carbohydrates to sugar and to reduce the biotin content from more than 5 mcg. to less than 5 mcg. per 100 g. of carbohydrate. Such mixtures preferably have a mole ratio of nitric to sulfuric acid of at least 1:20.

The dry milling process by which the starch source starting material of the invention is obtained is a degermination method well known in the art. Briefly, the dry milling process involves cleaning the grain, preferably corn, and then while agitating it in a suitable container, spraying it with water or treating it with steam to raise its moisture content to about 20% and soften the hull, after which it is passed to a degerminating machine to produce a germ fraction and a crude starch fraction containing protein. The protein-containing starch fraction, i.e., dry-milled corn starch, is separated and recovered from the germ fraction and is used in the process of the present invention. Dry-milled corn starch will usually contain from about 5 to about 10% protein, about 4 to about 6% fat, and about 70 to about 80% carbohydrate.

Although the present invention has been described using dry-milled corn starch, it will be obvious to those versed in this art that other equivalents of the dry-milled corn starch which equivalents contain biotin in excess of 5 mcg. per 100 g. of carbohydrate may also be used. Such equivalents containing biotin include whole ground corn, for instance.

NITRIC ACID HYDROLYZED STARCH

A nitric acid hydrolyzed starch solution was obtained by hydrolyzing a suspension of 510 g. of dry-milled corn starch in 2700 ml. of tap water, adding 20 ml. of 70% by weight nitric acid, heating to 80° C. until the suspension became thin, then autoclaving the solution under 15 p.s.i.g. steam pressure for 2 hours. The resulting hydrolyzed starch solution was then cooled and adjusted to a pH of 5.0 with ammonium hydroxide. This solution contained 13.5% by weight reducing sugars calculated as glucose and the free biotin content was less than 0.15 $\gamma$/l., equivalent to less than 0.11 mcg. per 100 g. of carbohydrate.

SULFURIC ACID HYDROLYZED STARCH

A sulfuric acid hydrolyzed starch solution was prepared in the same manner as the nitric acid hydrolyzed starch solution except that 17 ml. of concentrated sulfuric acid was added in place of the nitric acid. The sulfuric acid hydrolyzed starch solution contained 13.9% by weight reducing sugars calculated as glucose and the biotin content was 8.4 $\gamma$/l., equivalent to about 6 mcg. of biotin per 100 g. of carbohydrate. A biotin equivalent content of over 5 mcg. per 100 g. of carbohydrate is regarded as too high for a satisfactory carbohydrate for glutamic acid production.

The following examples are offered to illustrate the present invention; however, the process is not to be limited by them. Rather, it is intended to include within the scope of the invention, all equivalents obvious to those skilled in the art.

Example 1

A hydrolyzed starch solution was obtained by preparing a suspension of 170 g. dry-milled cornstarch in 900 ml. of tap water, adding 6.3 ml. of concentrated nitric acid heating at 80° C. until the suspension became thin, adding 85 g. more of starch suspended in 100 ml. tap water, again heating at 80° C. until the suspension became thin, and then autoclaving the solution under 15 pounds per square inch steam pressure for 2 hours. The resulting hydrolyzed starch solution was then cooled and adjusted to a pH of 5.0 with ammonium hydroxide. This solution contained 17% by weight reducing sugars calculated as glucose.

An amount of nitric acid-hydrolyzed starch solution equivalent to 10 grams of reducing sugar calculated as glucose was employed as the carbohydrate source in the preparation of a nutrient medium which had the following composition:

| | | |
|---|---|---|
| Carbohydrate, glucose equivalent | g | 10 |
| Urea | g | 0.4 |
| Dipotassium phosphate ($K_2HPO_4$) | g | 0.1 |
| Magnesium sulfate ($MgSO_4 \cdot 7H_2O$) | g | 0.05 |
| Manganese sulfate ($MnSO_4 \cdot H_2O$) | p.p.m. | 4 |
| Ferrous sulfate ($FeSO_4 \cdot 7H_2O$) | p.p.m. | 4 |
| Adjust pH with NaOH solution to | | 7.0 |
| Tap water, q.s. | ml. | 100 |

Three, 100-ml. portions of the nutrient medium were prepared according to the above formula, and each was delivered to sterile, 500-ml. fermentation flasks denoted A, B, and C. No other additives were employed with A, but 75 mg. of autolyzed yeast was added to B to compensate for the biotin deficiency, and 150 mg. of autolyzed yeast was added to C to further compensate for biotin deficiency. These flasks were then sterilized for 10 minutes at 10 p.s.i. pressure. Aliquots of 20 ml. each of A, B, and C were then delivered to previously sterilized 500 ml. fermentation flasks which were then inoculated with 1 ml. of a 16-hour inoculant culture.

The inoculant culture was prepared by combining 20 grams cerelose, 4 grams urea, 0.5 gram $K_2HPO_4$, 0.25 gram $MgSO_4 \cdot 7H_2O$, 4 p.p.m. $FeSO_4 \cdot 7H_2O$, 4 p.p.m. $MnSO_4 \cdot H_2O$, 1 gram autolyzed yeast, enough water and $NH_4OH$ to make 500 milliliters of medium with a pH of 7.3 of the above inoculant medium, 100 ml. portions were put into flasks and sterilized for 15 minutes at 10 pounds per square inch pressure. Each flask was inoculated with one loop full of a culture of *Brevibacterium divaricatum* (the strain NRRL B–2311 was used). These flasks were then incubated for about 16 hours at 29–31° C. with aeration and agitation provided by rotary shaking at 300 r.p.m.

After inoculation, the fermentation flasks were incubated at a temperature of 29–31° C. and a pH of 6–8 maintained with urea throughout the fermentation. The flasks were agitated by rotary shaking at 300 r.p.m. The results, tabulated in Table 1, show that poor growth occurred in Run A as a result of biotin deficiency and the amount of glutamic acid produced was low. In Run B, the growth and glutamic acid production were greatly improved due to the higher biotin content and in Run C, growth and glutamic acid production are still higher. Run F was conducted with a nutrient medium prepared as previously described except that the carbohydrate source was sulfuric acid hydrolyzed starch solution. Heavy growth of the microorganism was obtained due to excessive amounts of biotin in the medium, but the glutamic acid produced was small.

The degree of growth is measured by the light transmittancy of a 1:50 dilution of the medium containing the growing microorganism. As the microorganism grows, the nutrient medium grows more opaque and percentage light transmission falls.

TABLE 1

|  | Biotin | Percent Transmission | Glutamic Acid, g./l. |
|---|---|---|---|
| Run A | Deficient | 75 | 10.1 |
| Run B | Improved | 37 | 26.6 |
| Run C | Adequate | 29 | 32.2 |
| Run F | Excessive | 21 | 8.7 |

*Example II*

The nitric acid-hydrolyzed starch solution of Example I is utilized as the carbohydrate source in the nutrient medium used in a fermentation for the production of glutamic acid following essentially the same procedure used in Example I except a glutamic acid-producing strain of the organism *Micrococcus glutamicus* is employed.

*Example III*

The nitric acid-hydrolyzed starch solution of Example I is utilized as the carbohydrate source in the nutrient medium used in a fermentation for the production of glutamic acid following essentially the same procedure used in Example I except a glutamic acid-producing strain or the organism *Bacillus subtilus* is used.

*Example IV*

The nitric acid-hydrolyzed starch solution of Example I is utilized as the carbohydrate source in the nutrient medium utilized in a fermentation for the production of glutamic acid following essentially the same procedure used in Example I except an acid-producing strain of the organism *Micrococcus varians* is used.

*Example V to Example VII*

The nitric acid-hydrolyzed starch solution of Example I is utilized as the carbohydrate source in the nutrient medium utilized in a fermentation for the production of glutamic acid following essentially the same procedure used in Example I except a glutamic acid-producing strain of the organisms *Brevibacterium divaricatum* NRRL-2312, *Microbacterium flavum*, *Corynebacterium lilium*, and *Arthrobacter glofiformis*, respectively, are used instead of *Brevibacterium divaricatum* NRRL-2311.

It is claimed:

1. A process for the production of glutamic acid by fermentation which comprises hydrolyzing in the presence of nitric acid a starch source containing more than 5 mcg. of biotin per 100 g. of carbohydrate, incorporating said hydrolyzed starch in a nutrient fermentation medium, cultivating a glutamic acid-producing strain of the organism *Brevibacterium divaricatum* in said fermentation medium and recovering glutamic acid from said medium.

2. A process for the production of glutamic acid by fermentation which comprises hydrolyzing a starch source containing more than 5 mcg. of biotin per 100 g. of carbohydrate in the presence of nitric acid for a length of time sufficient to hydrolyze the starch in said starch source to sugar whereby substantially all of the biotin is inactivated, neutralizing said hydrolyzed starch to pH 7.0, incorporating said hydrolyzed starch in a nutrient fermentation medium comprising a nitrogen source, a potassium source, a phosphate source, a biotin source and trace amounts of mineral salts, cultivating a glutamic acid-producing strain of the organism *Brevibacterium divaricatum* in said fermentation medium and recovering glutamic acid from said medium.

3. The process of claim 2 wherein the *Brevibacterium divariactum* is NRRL B-2312.

4. The process of claim 2 wherein the *Brevibacterium divaricatum* is NRRL B-2311.

5. A process for the production of glutamic acid by fermentation which comprises hydrolyzing a starch source containing more than 5 mcg. of biotin per 100 g. of carbohydrate in the presence of nitric acid, incorporating said hydrolyzed starch source in a nutrient fermentation medium, cultivating a glutamic acid-producing microorganism in said nutrient fermentation medium and recovering glutamic acid from said medium.

6. A process for the production of glutamic acid by fermentation which comprises hydrolyzing starch containing more than 5 mcg. of biotin per 100 g. of carbohydrate in the presence of nitric acid in an amount and for a time sufficient to hydrolyze said starch whereby the biotin content is lowered to less than 5 mcg. per 100 g. of carbohydrate, incorporating said hydrolyzed starch in a nutrient fermentation medium, and cultivating a glutamic acid-producing microorganism in said hydrolyzed starch containing nutrient fermentation medium to produce glutamic acid and recovering glutamic acid from said medium.

7. The process of claim 6 wherein said microorganism is selected from the group consisting of the glutamic acid-producing strains of the genera Bacillus, Micrococcus, Microbacterium, Brevibacterium, Corynebacterium, and Arthrobacter.

8. In a process for the production of glutamic acid by fermentation comprising cultivating a glutamic acid-producing microorganism in a nutrient fermentation medium containing a carbohydrate source to produce glutamic acid, and recovering glutamic acid from said medium, that step comprising incorporating in said fermentation medium as the said carbohydrate source hydrolyzed starch having before hydrolysis a biotin content of more than 5 mcg. of biotin per 100 g. of carbohydrate, said hydrolyzed starch having been hydrolyzed in the presence of nitric acid whereby the biotin content was reduced to less than 5 mcg. per 100 g. of carbohydrate.

No references cited.

LIONEL M. SHAPIRO, *Primary Examiner.*